(12) United States Patent
Kimishima et al.

(10) Patent No.: US 11,536,344 B2
(45) Date of Patent: Dec. 27, 2022

(54) VALVE AND SHOCK ABSORBER

(71) Applicant: KYB Corporation, Tokyo (JP)

(72) Inventors: Kazuyuki Kimishima, Gifu (JP);
Takeshi Yasui, Aichi (JP)

(73) Assignee: KYB CORPORATION, Tokyo (JP)

( * ) Notice: Subject to any disclaimer, the term of this patent is extended or adjusted under 35 U.S.C. 154(b) by 187 days.

(21) Appl. No.: 16/982,917

(22) PCT Filed: Apr. 2, 2019

(86) PCT No.: PCT/JP2019/014601
§ 371 (c)(1),
(2) Date: Sep. 21, 2020

(87) PCT Pub. No.: WO2019/194167
PCT Pub. Date: Oct. 10, 2019

(65) Prior Publication Data
US 2021/0010557 A1 Jan. 14, 2021

(30) Foreign Application Priority Data
Apr. 6, 2018 (JP) .............................. JP2018-073596

(51) Int. Cl.
*F16F 9/34* (2006.01)
*F16K 1/22* (2006.01)
(Continued)

(52) U.S. Cl.
CPC ............ *F16F 9/348* (2013.01); *F16K 1/2263* (2013.01)

(58) Field of Classification Search
CPC ............ F16F 9/348; F16F 9/34; F16F 9/3485; F16F 9/3481; F16F 9/3487; F16F 9/3488;
(Continued)

(56) References Cited

U.S. PATENT DOCUMENTS 5,042,624 A * 8/1991 Furuya .................... F16F 9/348
                                                      188/322.22
5,709,290 A * 1/1998 Ekert .................... F16F 9/3482
                                                      188/322.22
(Continued)

FOREIGN PATENT DOCUMENTS

JP    S56-32146 U    3/1981
JP    S59-113537 U   7/1984
(Continued)

*Primary Examiner* — Robert A. Siconolfi
*Assistant Examiner* — James K Hsiao
(74) *Attorney, Agent, or Firm* — Rabin & Berdo, P.C.

(57) ABSTRACT

The valve includes a valve case; an annular valve body, an outer peripheral end of which is a free end movable to both sides in an axial direction with respect to the valve case; a facing portion provided in the valve case, the facing portion including an annular facing surface which is located on an outer peripheral side of the valve body and is configured to face the free end with a gap; and first and second valve stoppers which are located on both sides respectively in the axial direction of the valve body. The first and second valve stoppers, respectively, have a plurality of support portions that are configured to support different positions of the valve body in a radial direction at different heights when the valve body deflects.

10 Claims, 4 Drawing Sheets (51) Int. Cl.
*F16F 9/348* (2006.01)
*F16K 1/226* (2006.01)

(58) Field of Classification Search
CPC ....... F16F 9/3484; F16F 9/3482; F16K 1/222; F16K 1/2263
USPC .................................................... 188/322.13
See application file for complete search history.

(56) References Cited

U.S. PATENT DOCUMENTS

| | | | | |
|---|---|---|---|---|
| 7,143,684 B2* | 12/2006 | Dourson | ............... | F16F 9/3485 91/422 |
| 8,794,407 B2* | 8/2014 | Vanbrabant | ............... | F16F 9/34 188/315 |
| 9,212,719 B2* | 12/2015 | Kim | ............... | F16F 9/5126 |
| 9,249,854 B2* | 2/2016 | Kim | ............... | F16F 9/3485 |
| 9,410,595 B2* | 8/2016 | Yamada | ............... | F16F 9/3484 |
| 9,777,790 B2* | 10/2017 | Mizuno | ............... | F16F 9/3485 |
| 10,408,240 B2* | 9/2019 | Mori | ............... | F16F 9/185 |
| 2002/0108826 A1* | 8/2002 | Miller | ............... | F16F 9/466 188/280 |
| 2004/0211633 A1* | 10/2004 | Kajino | ............... | F16F 9/3484 188/322.15 |
| 2005/0045438 A1* | 3/2005 | Keller | ............... | F16F 9/0227 188/282.5 |
| 2005/0211087 A1 | 9/2005 | Dourson et al. | | |
| 2009/0051086 A1* | 2/2009 | Baltes | ............... | F16F 9/3485 267/64.15 |
| 2009/0071775 A1* | 3/2009 | Naito | ............... | F16F 9/465 188/275 |
| 2009/0084647 A1* | 4/2009 | Maneyama | ............... | F16F 9/34 188/314 |
| 2009/0090588 A1* | 4/2009 | Berger | ............... | F16F 9/3485 188/322.15 |
| 2009/0107782 A1* | 4/2009 | Ota | ............... | F16F 9/3485 188/282.5 |
| 2010/0084234 A1* | 4/2010 | Marble | ............... | F16F 9/3485 188/280 |
| 2011/0114428 A1* | 5/2011 | Vanbrabant | ............... | F16F 9/5126 188/322.15 |
| 2014/0060315 A1* | 3/2014 | Mori | ............... | F16F 9/00 91/418 |
| 2015/0240902 A1* | 8/2015 | Slusarczyk | ............... | F16F 9/3488 188/322.15 |
| 2015/0316118 A1* | 11/2015 | Smeljanskij | ............... | F16K 15/144 188/313 |
| 2016/0356335 A1* | 12/2016 | Nomura | ............... | F16F 9/19 |
| 2017/0152910 A1* | 6/2017 | Schaffelhofer | ............... | F16F 9/348 |
| 2018/0216690 A1* | 8/2018 | Yamashita | ............... | F16F 9/185 |
| 2018/0340589 A1* | 11/2018 | Cheong | ............... | F16F 9/3485 |

FOREIGN PATENT DOCUMENTS

| | | | |
|---|---|---|---|
| JP | S63-68535 U | | 5/1988 |
| JP | H02-76937 A | | 3/1990 |
| JP | 2009299768 A | * | 12/2009 |
| JP | 2016-173140 A | | 9/2016 |

* cited by examiner

VALVE AND SHOCK ABSORBER

TECHNICAL FIELD

The present invention relates to a valve and a shock absorber comprising the valve.

BACKGROUND ART

Conventionally, for example, a valve is used to generate a damping force by providing resistance to a flow of a liquid generated during extension and contraction of a shock absorber. Some of such valves include a ring-shaped valve body in which one of an inner circumference and an outer circumference is fixed to a valve case, and the other is a free end that can move to both axial sides, and a gap that allows passage of a fluid is formed in the outer circumference or inner circumference of the free end of the valve body (JPH02-76937A).

According to the above-described configuration, when the extension/contraction speed (piston speed) of the shock absorber is in a low speed region such that the valve body does not deflect, the gap formed at the outer periphery or the inner periphery of the free end of the valve body is maintained in a narrow state. However, as the piston speed of the shock absorber increases and the end of the free end side deflects, the gap formed at the outer periphery or inner periphery of the free end becomes wider. Therefore, a damping coefficient of the shock absorber becomes small when the piston speed increases, and the damping force characteristic of the shock absorber becomes a characteristic that depends on the speed.

SUMMARY OF INVENTION

In the valve shown in FIG. 8 of JPH02-76937A, the end of a fixed end side of the valve body is pressed by a spacer, and the edge on the free end side of an abutment portion where the spacer and the valve body abut is made a fulcrum (hereinafter referred to as a deflection fulcrum) and the valve body is deflected. Further, the valve includes a valve stopper and can limit the amount of deflection of the valve body by the valve stopper.

However, in the conventional valve described above, as shown in FIG. 6, when a valve body 800 is deflected, there is a case where the valve body 800 deforms so as to undulate along a step that caused by a difference in height between a deflection fulcrum F3 of the valve body 800 and a support portion S5 of a valve stopper B3 supporting the valve body 800. Then, in FIG. 6, stress is concentrated in a portion as shown by arrows Y1, Y2, there is a possibility that the durability of the valve body 800 is reduced.

An object of the present invention is to provide a valve capable of improving a durability of a valve body, and a shock absorber having the valve.

According to one aspect of the present invention, a valve includes: a valve case; an annular valve body, one of an inner peripheral end and an outer peripheral end of which is a free end movable to both sides in an axial direction with respect to the valve case; an facing portion provided in the valve case, the facing portion including an annular facing surface which is located on an inner peripheral side or an outer peripheral side of the valve body and is configured to face the free end with a gap; and first and second valve stoppers which are located on both sides respectively in the axial direction of the valve body. The first and second valve stoppers, respectively, have a plurality of support portions that are configured to support different positions of the valve body in a radial direction at different heights when the valve body deflects.

DESCRIPTION OF EMBODIMENTS

An embodiment of the present invention will be described below with reference to the drawings. The same reference numerals show the same parts throughout the several views.

Figure 1:
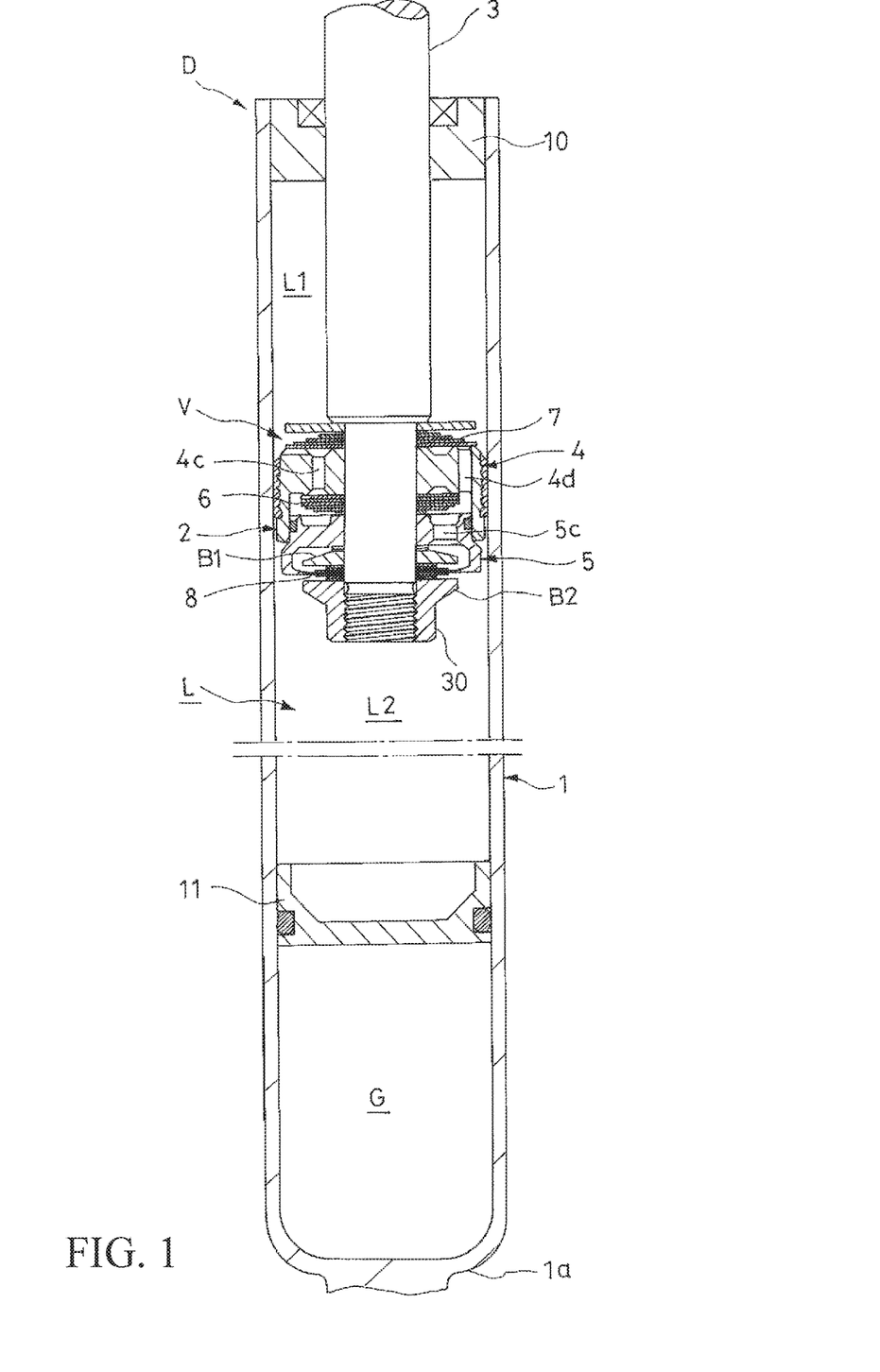
FIG. 1 is a longitudinal sectional view showing a shock absorber having a valve serving as a damping valve according to an embodiment of the present invention.

As shown in FIG. 1, a valve according to the embodiment of the present invention is a damping valve V embodied in a piston portion of a shock absorber D. The shock absorber D is interposed between a vehicle body and an axle of a vehicle such as an automobile. In following descriptions, for convenience of description, the upper and lower portions of the shock absorber D shown in FIG. 1 are simply referred to as "upper" and "lower" unless otherwise specifically described.

It should be noted that an object to which the shock absorber having the valve according to the embodiment of the present invention is attached is not limited to the vehicle and can be appropriately changed. Further, an orientation of the shock absorber in a mounting state can be appropriately changed according to the object. Specifically, the shock absorber may be attached to the vehicle in the same direction as the shock absorber D in FIG. 1, it may be attached to the vehicle upside down direction from the shock absorber D FIG. 1.

A specific structure of the shock absorber D will be described. As shown in FIG. 1, the shock absorber D includes a bottomed cylindrical cylinder 1 having an open upper end, a piston 2 slidably inserted into the cylinder 1, and a piston rod 3 whose lower end is connected to the piston 2 and whose upper end protrudes out of the cylinder 1.

The piston rod 3 is inserted axially movable into the cylinder 1. At the upper end of the piston rod 3 is provided with a bracket (not shown). The piston rod 3 is connected to one of the vehicle body and the axle via the bracket. At a bottom 1a of the cylinder 1 is provided with bracket (not shown). The cylinder 1 is connected to the other of the vehicle body and the axle via the bracket.

In this manner, the shock absorber D is interposed between the vehicle body and the axle. When the wheels vibrate vertically with respect to the vehicle body as the vehicle travels on an uneven road surface or the like, the piston rod 3 is moved into and out from the cylinder 1, and thereby, the shock absorber D expands and contracts, while the piston 2 moves in a vertical direction (axial direction) in the cylinder 1.

The shock absorber D includes an annular cylinder head 10 which closes an opening at the upper end of the cylinder 1 and slidably supports the piston rod 3. The lower end of the cylinder 1 is closed by the bottom portion 1a. Therefore, an inside of the cylinder 1 is a sealed space. On the side opposite to the piston rod 3 when viewed from the piston 2 in the cylinder 1, a free piston 11 serving as a movable partition wall is slidably inserted.

A liquid chamber L is formed on the upper side of the free piston 11 in the cylinder 1, and a gas chamber G is formed on the lower side of the free piston 11. The liquid chamber L is partitioned by the piston 2 into an extension-side chamber L1 on the piston rod 3 side (the cylinder head 10 side) and a contraction-side chamber L2 on the piston 2 side (the bottom 1a side). Each of the extension-side chamber L1 and the contraction-side chamber L2 is filled with a liquid such as a working oil serving as a working fluid. Air or a gas such as nitrogen gas is sealed in the gas chamber G in a compressed state.

When the shock absorber D extends, the piston rod 3 moves out from the cylinder tube 1, and the volumetric capacity in the cylinder tube 1 increases by an amount corresponding to the volume of the piston rod 3 that has moved out. As a result, the free piston 11 moves upward within the cylinder tube 1 to expand the gas chamber G. In contrast, when the shock absorber D contracts, the piston rod 3 moves into the cylinder tube 1, and the volumetric capacity in the cylinder tube 1 decreases by an amount corresponding to the volume of the piston rod 3 that has moved in. As a result, the free piston 11 moves downward within the cylinder tube 1 to contract the gas chamber G.

Instead of the free piston 11, a bladder, a bellows, or the like may be used to partition the liquid chamber L and the gas chamber G. The configuration of movable partition wall functioning as a partition may be appropriately changed.

Furthermore, in this embodiment, the shock absorber D is of a single-rod and mono-tube type. When the shock absorber D extends/contracts, the gas chamber G is expanded/compressed by the free piston (the movable partition wall) 11, and thereby, the volume of the piston rod 3 moving into and out from the cylinder tube 1 is compensated for. In contrast, the configuration for the volume compensation may be changed appropriately.

For example, the free piston (the movable partition wall) 11 and the gas chamber G may be omitted, and the shock absorber may be formed as a twin-tube type by providing an outer shell on an outer circumference of the cylinder tube 1, and then, a reservoir chamber that stores the liquid between the cylinder 1 and the outer shell may be formed. In this case, the volume compensation is achieved by the reservoir chamber. Furthermore, the reservoir chamber may be formed in a tank that is provided separately from the cylinder tube 1.

In addition, the shock absorber may be formed as a double-rod type by providing piston rods on both sides of the piston. In such a case, it is not necessary to achieve the volume compensation for the piston rods itself.

The piston 2 has two valve cases which are held by a nut 30 on the outer periphery of the piston rod 3. Hereinafter, in order to distinguish the two valve cases, the valve case on which main valve bodies 6 and 7 described later are stacked is referred to as the main valve case 4, the other valve case to which a valve body 8 described later is attached is simply referred to as the valve case 5.

Thus, the piston 2 of the present embodiment functions as a valve case for mounting a valve body such as the main valve bodies 6 and 7 or the valve body 8. The piston 2 constitutes a damping valve V together with the valve body or the like. Hereinafter, the configuration of the damping valve V will be described.

Figure 2:
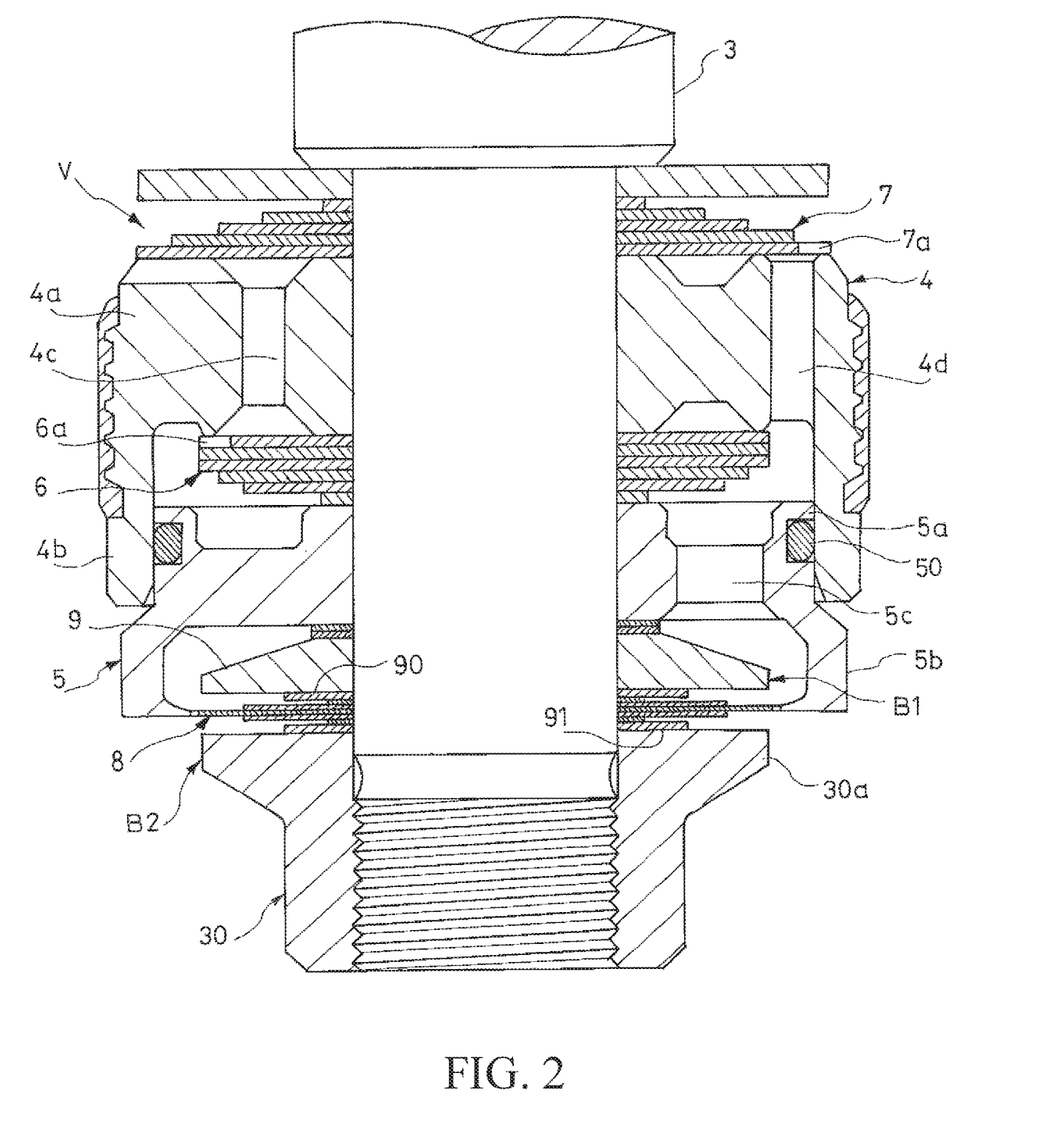
FIG. 2 is a partial enlarged view showing a part of FIG. 1.

As shown in FIG. 2, the main valve case 4 has an annular main body portion 4a, and a cylindrical skirt portion 4b protruding downward from the lower end outer peripheral portion of the main body portion 4a. A extension-side passage 4c and a contraction-side passage 4d are formed in the main body portion 4a. The passage 4c and the passage 4d penetrate through the main body portion 4a in the axial direction and opens on the inner peripheral side of the skirt portion 4b. The extension-side main valve body 6 for opening and closing the outlet of the extension-side passage 4c is stacked on the lower side of the main body portion 4a (contraction-side chamber L2 side). The contraction-side main valve body 7 for opening and closing the outlet of the contraction-side passage 4d is stacked on the upper side of the main body portion 4a (extension-side chamber L1 side).

Each of the main valve bodies 6 and 7 is laminated leaf valves that is configured to laminate a plurality of elastically deformable leaf valves. The extension-side main valve body 6 opens when the piston speed is in a medium-high-speed range during the extension of the shock absorber D, and thereby, the main valve body 6 provides a resistance to a flow of the liquid from the extension side chamber L1 to the contraction-side chamber L2 through the extension-side passage 4c. The contraction-side main valve body 7 opens when the piston speed is in the medium-high-speed range during the contraction of the shock absorber D, and thereby, the contraction-side main valve body 7 provides a resistance to a flow of the liquid from the contraction-side chamber L2 to the extension-side chamber L1 through the contraction-side passage 4d. It should be noted that the piston speed refers to the speed of the piston rod 3 moving relative to the cylinder 1, that is, the extension and contraction speed of the shock absorber D.

Of the plurality of the leaf valves constituting the main valve bodies 6 and 7, the first leaf valves located on the most main valve case 4 side (that is, the leaf valves abutting the main body portion 4a) are respectively formed with notches 6a and 7a at the outer peripheral portion. When the piston speed is in a low-speed range and the main valve bodies 6 and 7 close, the liquid passes between the extension-side chamber L1 and the contraction-side chamber L2 through an orifice formed by the notches 6a and 7a. The orifice (notches 6a and 7a) provides a resistance to a flow of the fluid.

The orifices formed by the notches 6a and 7a allow bidirectional flow of the liquid. Therefore, one of the notches 6a and 7a formed in the main valve bodies 6 and 7 may be omitted. The method of forming the orifice can be appropriately changed. For example, a groove may be formed by stamping a valve seat which the main valve bodies 6 and 7 are separated from and seated on, and the orifice may be formed by the stamped groove. The orifice may be replaced by a choke. Furthermore, the main valve bodies 6 and 7 attached to the main valve case 4 for generating a damping force in the medium-high-speed range to the shock absorber D may be other than the laminated leaf valves, for example, may be a poppet valve or the like.

The valve case 5 has an annular fitting portion 5a fitting to the inner periphery of the skirt portion 4b of the main valve case 4, and a cylindrical case portion 5b protruding downward from the lower end outer peripheral portion of the fitting portion 5a. Between the fitting portion 5a and the skirt portion 4b, a seal 50 for sealing between the fitting portion 5a and the skirt portion 4b is provided. The fitting portion 5a is formed with a communication passage 5c which penetrates through the fitting portion 5a in the axial direction and opens to the inner peripheral side of the case portion 5b.

Two stopper members 9 and 90 having different outer diameters are accommodated in the case portion 5b. Furthermore, the valve body 8 and the stopper member 91 are stacked on the lower side of the two stopper members 9 and 90. A nut 30 is abutted against the lower end of the stopper member 91. Thus, the stopper members 90 and 91 are positioned on both sides of the valve body 8 in the axial direction, further the stopper member 9 and the nut 30 are positioned on both sides of the stopper members 90 and 91.

Figure 3:
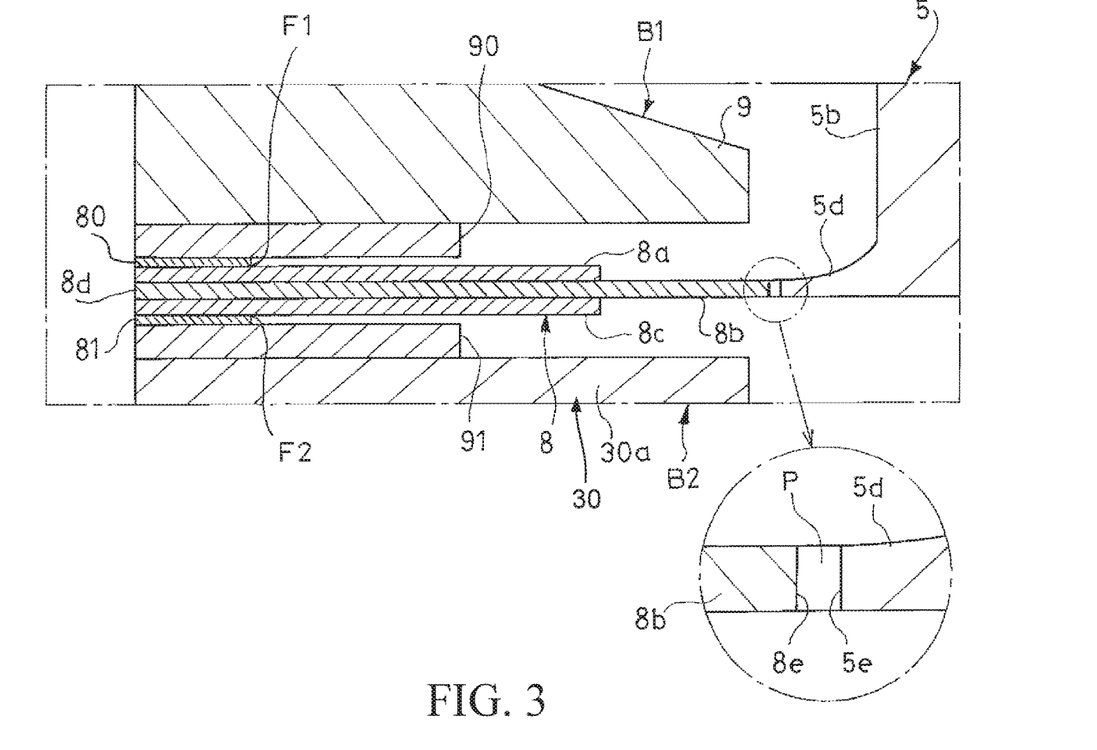
FIG. 3 is a partial enlarged view showing a part of FIG. 2 in a further enlarged manner.

The valve body 8 of the present embodiment, as shown in FIG. 3, has three leaf valves 8a, 8b, and 8c laminated. The valve body 8 is elastically deformable. The outer diameter of the leaf valve 8b located at the center of the three leaf valves constituting the annular valve body 8 is larger than the outer diameter of the leaf valves 8a and 8c located at the upper and lower ends. A spacer 80 is interposed between the leaf valve 8a located at the upper end and the stopper member 90 directly above the leaf valve 8a. A spacer 81 are interposed between the leaf valve 8c located at the lower end and the stopper member 91 directly below the leaf valve 8c.

Each of the spacers 80 and 81 is annular plate and has the outer diameter which is smaller than the outer diameter of each leaf valve 8a, 8b, and 8c constituting the valve body 8. The valve body 8 is fixed to the valve case 5 in a state where its inner peripheral portion sandwiched between spacers 80 and 81. The portion of the outer peripheral side than the spacers 80 and 81 of the valve body 8 can move in the vertical direction (axial direction) with the outer peripheral edge (deflection fulcrums F1 and F2) of an abutting portion between the spacers 80, 81 and the valve body 8 as a fulcrum.

Thus, in this embodiment, the end of inner peripheral side (inner peripheral end) of the valve body 8 mounted on the valve case 5 is a fixed end 8d that does not move relative to the valve case 5. Furthermore, the outer peripheral surface of the central leaf valve 8b located at the end of the outer peripheral side (outer peripheral end) of the valve body 8 is a free end 8e which can move up and down (both sides in the axial direction) with respect to the valve case 5.

An annular facing portion 5d protruding inward in the radial direction (the central axis side of the shock absorber D) from the inner periphery of the case portion 5b is formed at the distal end of the case portion 5b in the valve case 5. The valve body 8 is accommodated in the inner periphery side of the facing portion 5d. In the extremely low-speed range where the piston speed is close to 0 (zero), such as when the shock absorber D starts to move, the valve body 8 does not deflect and is kept in an initial state of mounting (FIG. 3).

Thus, in a state where the valve body 8 does not deflect, the free end 8e of the valve body 8 faces a facing surface 5e formed on the inner periphery of the facing portion 5d with a predetermined gap P (FIG. 3). In the present embodiment, the gap P formed between the facing surface 5e and the free end 8e of the valve body 8 is very small. An opening area of the gap P is smaller than an opening area of all the orifices (that is, the sum of an opening area of the orifice formed by the notch 6a and an opening area of the orifice formed by the notch 7a) formed by the notches 6a and 7a formed in the main valve bodies 6 and 7.

Figure 4:
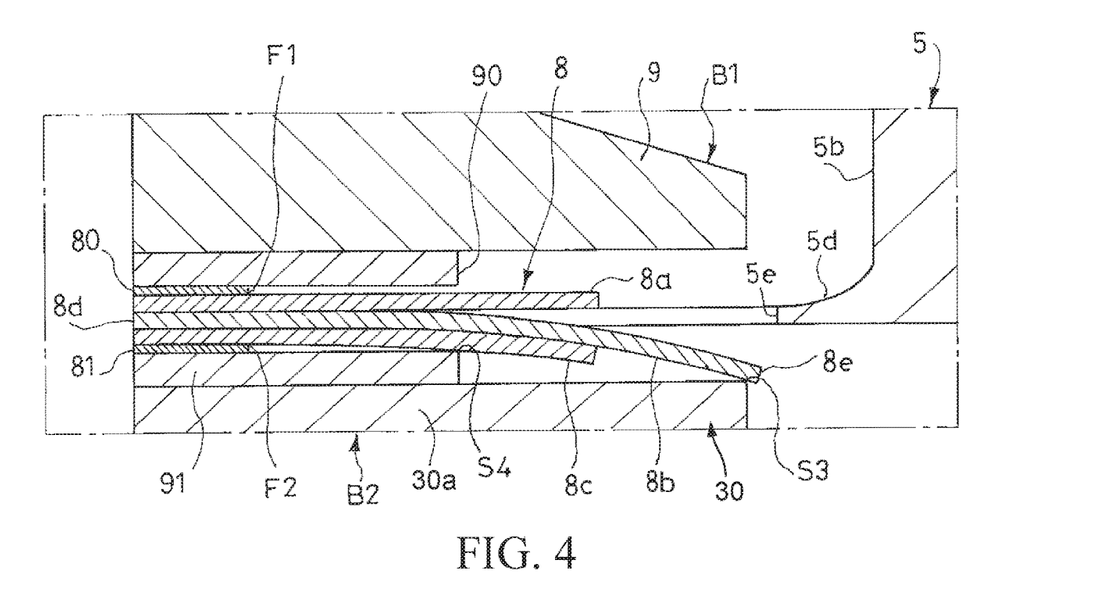
FIG. 4 is a partial enlarged view showing a state where an outer peripheral portion of a valve body of FIG. 3 is deflected to a lower side in a drawing.
Figure 5:
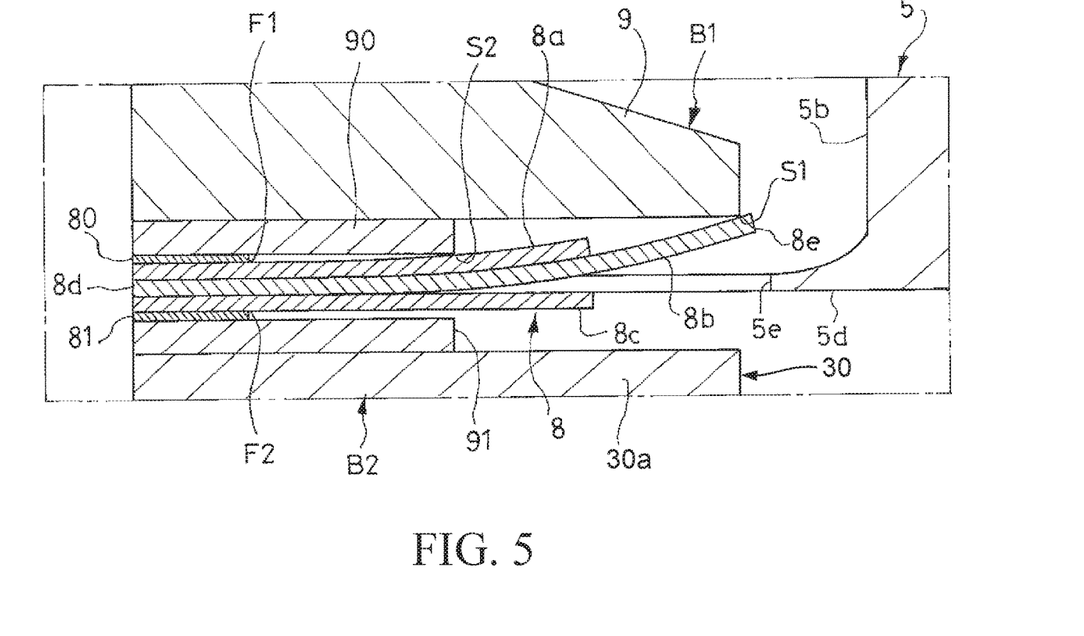
FIG. 5 is a partial enlarged view showing a state where the outer peripheral portion of the valve body of FIG. 3 is deflected to an upper side in a drawing.

When the shock absorber D extends and the piston speed is in the low-speed range or the medium-high-speed range (that is, when the piston speed is not in the extremely low-speed range), the outer peripheral portion of the valve body 8 deflects downward with the fulcrum F2 as shown in FIG. 4. In contrast, when the shock absorber D contracts and the piston speed is in the low-speed region or medium-high-speed range (that is, when the piston speed is not in the extremely low-speed region), the outer peripheral portion of the valve body 8 deflects upward with the fulcrum F1 as shown in FIG. 5.

Thus, in the low-speed range and medium-high-speed range in which the outer peripheral portion of the valve body 8 (the end portion of the free end 8e side) deflects vertically, an opening area of a gap formed between the free end 8e of the valve body 8 displaced vertically and the facing surface 5e is larger than the opening area of all the orifices (that is, the sum of the opening area of the orifice formed by the notch 6a and the opening area of the orifice formed by the notch 7a) formed by the notches 6a and 7a.

In the present embodiment, a first valve stopper B1 is configured to have the two stopper members 9 and 90 positioned on the upper side of the valve body 8 to limit an amount of upward deflection of the valve body 8. The outer diameter of the stopper member 9 disposed on the upper side (anti-valve body side) is larger than the outer diameter of the stopper member 90 disposed on the lower side (valve body side). The lower end outer peripheral edges of the upper and lower stopper members 9 and 90 are respectively support portions S1 and S2 for supporting the valve body 8 in contact with the upper surface of the valve body 8 (FIG. 5).

Furthermore, the support portions S1 and S2 are at positions displaced from each other in the radial direction and the axial direction, and the support portions S1 and S2 support the valve body 8 at different positions each other in the radial direction and the height direction. More specifically, when a position close to the valve body 8 is defined as a lower position and a position distant to the valve body 8 is defined as a high position in a non-deflection of the valve body 8, the support portion S1 provided on the upper stopper member 9 supports the free end 8e side of the valve body 8 higher position than the support portion S2 provided on the lower stopper member 90.

Further, in the embodiment, a second valve stopper B2 is configured to have the stopper member 91 and the nut 30 positioned on the lower side of the valve body 8 to limit an amount of downward deflection of the valve body 8. The outer diameter of a stopper portion 30a provided on the upper end of the nut 30 (FIG. 3) is larger than the outer diameter of the stopper member 91. The upper end outer peripheral edges of the stopper portion 30a and the stopper member 91 are respectively support portions S3 and S4 for supporting the valve body 8 in contact with the lower surface of the valve body 8 (FIG. 4).

Furthermore, the support portions S3 and S4 are at positions displaced from each other in the radial direction and the axial direction, and the support portions S3 and S4 support the valve body 8 at different positions each other in the radial direction and the height direction. More specifically, the support portion S3 provided on the nut 30 supports the free end 8e side of the valve body 8 higher position than the support portion S4 provided on the stopper member 91.

According to the above configuration, when the valve body 8 deflects and comes into contact with the first (second) valve stopper B1 (B2), the valve body 8 deflects naturally such that the free end 8e side than the spacer 80 (81) becomes higher gradually toward the free end 8e. Therefore, the stress generated when the valve body 8 deflects can be dispersed to reduce the maximum generated stress, thereby improving the durability of the valve body 8.

Further, in the first valve stopper B1 of the present embodiment, a radial position of the support portion S2 provided on the inner peripheral side is positioned in the vicinity of the midpoint between the outer peripheral edge (deflection fulcrums F1) of the spacer 80 and the support portion S1 provided on the outer peripheral side. The plate thickness of the stopper member 90 is larger than the plate thickness of the spacer 80. Similarly, in the second valve stopper B2, the radial position of the support portion S4 provided on the inner peripheral side is positioned in the vicinity of the midpoint between the outer peripheral edge (deflection fulcrums F2) of the spacer 81 and the support portion S3 provided on the outer peripheral side. The plate thickness of the stopper member 91 is larger than the plate thickness of the spacer 81.

According to the above configuration, when the valve body 8 comes into contact with the first (second) valve stopper B1 (B2), the valve body 8 curves smoothly so that the inclination gradually increases toward the free end 8e. Therefore, the stress generated in the vicinity of the deflection fulcrums F1 and F2 of the valve body 8 is reduced, and thereby, it is possible to further improve the durability of the valve body 8.

Furthermore, in the present embodiment, the leaf valves 8a and 8c are laminated on the upper and lower of the leaf valve 8b including the free end 8e facing the facing surface 5e, and the sum of the plate thickness of the stopper member 90 and the plate thickness of the leaf valve 8a is larger than the plate thickness of the spacer 80, and the sum of the plate thickness of the stopper member 91 and the plate thickness of the leaf valve 8c is larger than the plate thickness of the spacer 81.

Therefore, in the leaf valve 8b including the free end 8e facing the facing surface 5e, although the deflection amount is increased when the valve body 8 deflects and comes into contact with the first (second) valve stopper B1 (B2), the leaf valve 8b curves smoothly so that the inclination gradually increases toward the free end 8e. Therefore, the stress generated in the vicinity of the leaf valve 8b of the valve body 8 is reduced, and thereby, it is possible to further improve the durability of the leaf valve 8b.

Further, in the present embodiment, the diameter of the free end 8e in the initial state of mounting the valve body 8 is not deflected is larger than the diameter of the support portions S1 and S3 provided on the outer peripheral side. Therefore, when the valve body 8 comes into contact with the first (second) valve stopper B1 (B2), it is possible to suppress a state in which a gap formed between the support portion S1 (S3) and the facing surface 5e is smaller than the gap formed between the free end 8e of the valve body 8 and the facing surface 5e, and thereby, it is possible to suppress a restriction of the flow of liquid in the gap formed between the support portion S1 (S3) and the facing surface 5e.

Furthermore, as described above, in a case where the diameter of the free end 8e is larger than the diameter of the support portions S1 and S3 provided on the outer peripheral side in the initial state of mounting, the vicinity of the free end 8e of the valve body 8 may come into contact with the support portions S1 and S3. Because, in such a way, when the valve body 8 comes into contact with the first (second) valve stopper B1 (B2), the portion protruding from the support portion S1 (S3) of the valve body 8 to the outer peripheral side is small, it is possible to prevent the valve body 8 from being largely deflected around the support portion S1 (S3) as a fulcrum and being deteriorated in durability.

In the present embodiment, when the valve body 8 deflects, the support portion S1 or S3 provided on the outer peripheral side abuts on the outer peripheral portion of the central leaf valve 8b and the support portion S2 or S4 provided on the inner peripheral side abuts on one of the leaf valves 8a and 8c disposed at both ends. However, the valve body 8 may be configured to have at least one leaf valve, and the leaf valve each support portion abuts can also be appropriately changed.

Hereinafter, an operation of the shock absorber D having the damping valve V (valve) according to the present embodiment will be described.

During extension of the shock absorber D, the piston 2 moves upward in the cylinder and compresses the extension-side chamber L1, and thereby, the liquid of the extension-side chamber L1 flows into the contraction-side chamber L2 through the extension-side main valve body 6 and the valve body 8. The extension-side main valve body 6, the orifices formed by the notched 6a and 7a of the main valve bodies 6 and 7, or the valve body 8 provide the resistance to the flow of liquid. As a result, the pressure in the extension-side chamber L1 increases and the shock absorber D generates the extension-side damping force that prevents the extension operation.

In contrast, during contraction of the shock absorber D, the piston 2 moves downward in the cylinder 1 and compresses the contraction-side chamber L2, and thereby, the liquid in the contraction-side chamber L2 flows into the extension-side chamber L1 through the valve body 8 and the contraction-side main valve body 7. The contraction-side main valve body 7, the orifices formed by the notched 6a and 7a of the main valve bodies 6 and 7, or the valve body 8 provide the resistance to the flow of liquid. As a result, the pressure in the contraction-side chamber L2 increases and the shock absorber D generates the contraction-side damping force that prevents the contraction operation.

In the present embodiment, in accordance with the piston speed, the extension-side main valve body 6 and the contraction-side main valve body 7 open or the outer peripheral portion of the valve body 8 (the end portion of the free end 8e side) deflects vertically, so that the shock absorber D can generate a speed-dependent damping force depending on the piston speed.

Hereinafter, it will be described in detail depending on the size of the piston speed. When the piston speed is in the extremely low-speed range close to 0, the main valve bodies 6 and 7 close, and the valve body 8 does not deflect and its free end 8e faces the facing surface 5e.

When the piston speed is in the extremely low-speed range during extension of the shock absorber D, the liquid flows into the skirt portion 4b from the extension-side chamber L1 through the notches 6a and 7a of the main valve bodies 6 and 7. The liquid flowing into the skirt portion 4b flows downward in FIG. 2 through the communication passage 5c and a gap between the first valve stopper B1 and the case portion 5b, and the liquid flows into the contraction-side chamber L2 through the gap P (FIG. 3) formed between the free end 8e of the valve body 8 and the facing surface 5e opposing each other.

In contrast, when the piston speed is in an extreme low-speed range during contraction of the shock absorber D, the liquid flows into the case portion 5b through the gap P formed between the free end 8e of the valve body 8 and the facing surface 5e opposing each other. The liquid flowing into the case portion 5b flows upward in FIG. 2 through the communication passage 5c and the gap between the first valve stopper B1 and the case portion 5b, and the liquid flows into the extension-side chamber L1 through the notches 6a and 7a of the main valve bodies 6 and 7.

As described above, the opening area of the gap P formed between the free end 8e of the valve body 8 and the facing surface 5e opposing each other is very small. Therefore, when the piston speed is in the extremely low-speed range, the shock absorber D generates the damping force in the extremely low-speed range caused by the resistance when the liquid flows through the gap P.

When the piston speed is increased and is out of the extremely low-speed range and is in the low-speed range, the main valve body 6 and 7 closes, and the outer peripheral portion of the valve body 8 (the end portion of the free end 8e side) deflects downward during extension of the shock absorber D and deflects upward during contraction of the shock absorber D, and thereby, the free end 8e of the valve body 8 and the facing surface 5e are vertically displaced. The opening area of the gap formed between the free end 8e and the facing surface 5e is larger than the opening area of the orifices formed by the notches 6a and 7a.

Therefore, when the piston speed is in the low-speed range, the shock absorber D generates the damping force in the low-speed range caused by the resistance of the orifices formed by the notches 6a and 7a. When the piston speed shifts from the extremely low-speed range to the low-speed region, a damping coefficient of the shock absorber D becomes small.

When the piston speed is further increased and is out of the low-speed range and is in the medium-high-speed range, of course the outer peripheral portion of the valve body 8 deflects upward or downward, and the extension-side main valve body 6 opens during extension of the shock absorber D and the contraction-side main valve body 7 opens during contraction of the shock absorber D.

In the present embodiment, when the extension-side main valve body 6 opens, the outer peripheral portion of the main valve body 6 deflects downward, so that the liquid can pass through a gap formed between the outer peripheral portion of the main valve body 6 and the main valve case 4. Similarly, when the contraction-side main valve body 7 opens, the outer peripheral portion of the main valve body 7 deflects upward, so that the liquid can pass through a gap formed between the outer peripheral portion of the main valve body 7 and the main valve case 4.

Therefore, when the piston speed is in the medium-high-speed range, the shock absorber D generates the damping force in the medium-high-speed range caused by the resistance of the gap formed by the opening of the main valve bodies 6 and 7. When the piston speed shifts from the low-speed region to medium-high-speed range, the damping coefficient of the shock absorber D becomes small.

In a case where the piston speed is in the medium-high-speed range, while the piston speed increases, the amount of deflection of the main valve bodies 6 and 7 may be regulated. In such a case, the coefficient becomes large again according to the increase of the piston speed, with the speed at which the deflection amount of the main valve bodies 6 and 7 is maximized as a boundary.

Hereinafter, the operation and effect of the damping valve (valve) V according to the present embodiment and the shock absorber D having the damping valve V will be described.

The damping valve (valve) V according to the present embodiment includes the valve case 5, the annular valve body 8 having the outer peripheral end which is the free end 8e movable to both sides in the axial direction with respect to the valve case 5, the facing portion 5d that is provided in the valve case 5 and includes the annular facing surface 5e that can face the free end 8e of the valve body 8 with the gap P, the first and second valve stoppers B1 and B2 which are located on both sides respectively in the axial direction of the valve body 8.

In the present embodiment, the first and second valve stoppers B1 and B2 have a plurality of support portions (S1, S2 or S3, S4) that can support different positions of the valve body 8 in a radial direction at different heights when the valve body 8 deflects. According to this configuration, even if a height difference between the deflection fulcrums F1 and F2 of the valve body 8 and the support portions S1, S3 supporting the valve body 8 at the highest position is large, the positions, lower than the support positions S1, S3 and radially displaced from the support positions S1, S3, are supported by the other support portions S2, S4. Therefore, the stress generated when the valve body 8 deflects is reduced, and thereby, it is possible to improve the durability of the valve body 8.

Further, in the present embodiment, the support portions S1 and S3 for supporting the outer peripheral side of the valve body 8 (the free end 8e side) is higher than the support portions S2 and S4 for supporting the inner peripheral side (the deflection fulcrums F1 and F2 side) than the support portions S2 and S4. In this way, in the present embodiment, among the plurality of support portions, the support portion supporting the valve body 8 at the free end 8e side supports the valve body 8 at higher position.

Therefore, when the valve body 8 deflects, the valve body 8 deflects naturally such that the free end 8e side than the deflection fulcrums F1 and F2 becomes higher gradually toward the free end 8e. Thus, according to this configuration, the stress generated in the valve body 8 can be dispersed to reduce the maximum generated stress efficiently and reasonably, and thereby, it is possible to improve the durability of the valve body 8 with certainty.

In the present embodiment, the first valve stopper B1 is configured to have the two annular stopper members 9 and 90 having different outer diameters each other. The support portions S1 and S2 are respectively provided on the two stopper members 9 and 90 (FIG. 5). Furthermore, the second valve stopper B2 is configured to have the annular stopper member 91 and the annular nut 30 having different outer diameters each other. The support portions S3 and S4 are respectively provided on the nut 30 and the stopper member 91 (FIG. 4).

Thus, the stopper members 9, 90, 91 and the nut 30 constituting the first and second valve stoppers B1 and B2 are annular members. The first and second valve stoppers B1 and B2, respectively, are configured to have a plurality of annular members having different outer diameters, and the support portions are provided on each of the annular members. Therefore, it is possible to easily adjust a position for supporting the valve body 8 using the support portion.

Specifically, for example, in the first valve stopper B1, if the stopper member 90 disposed on the valve body 8 side is changed to a stopper member having a larger outer diameter than the stopper member 90, the position where the support portion S2 supports the valve body 8 can be changed to the outer peripheral side (the free end 8e side). Further, if the stopper member 90 is changed to a thinner stopper member than the stopper member 90, it is possible to lower the position for supporting the valve body 8 of each support portion S1 and S2.

Thus, by forming the first and second valve stoppers B1 and B2 respectively with the plurality of annular members having different outer diameters, even if specifications (shape, material, number of the leaf valve, etc.) of the valve body in the damping valve (valve) is changed, it is possible to constitute a valve stopper suitable for the valve body by a combination of annular members having different diameters and thicknesses. That is, since the first and second valve stoppers B1 and B2 can be configured respectively by combining a highly versatile annular member, the first and second valve stoppers B1 and B2 can be inexpensive.

Further, in the present embodiment, as an annular member, disposed on the anti-valve body side, of the second valve stopper B2, a nut 30 for attaching the damping valve V to the outer periphery of the piston rod 3 is utilized. According to this configuration, since the nut 30 also functions as the second valve stopper B2, it is possible to reduce the number of components of the shock absorber D. It should be noted that an annular member may be provided separately from the nut 30.

Further, in the present embodiment, the number of support portions of the first and second valve stoppers B1 and B2 are respectively two, and the first and second valve stoppers B1 and B2 are respectively configured to have two annular members having different outer diameters. The number of the support portions provided on each of the first and second valve stoppers B1 and B2 is a plurality, the number of the support portions can be appropriately changed. The annular members constituting the valve stopper are stacked by the number of support portions, it can be easily formed even a valve stopper having three or more support portions.

However, the valve stopper may not necessarily be formed by a plurality of annular members. Specifically, for example, a step is formed on a surface facing the valve body side in the valve stopper, a plurality of support portions for supporting different positions of the valve body 8 in the radial direction at different heights may be formed by the steps. In such a case, the number of parts of the damping valve (valve) can be reduced.

Furthermore, in the present embodiment, the outer peripheral edges of the stopper members (annular member) 9, 90, 91 and the nut (annular member) 30 on the valve body 8 side are respectively support portions S1, S2, S3, and S4. The shape of the support portions S1, S2, S3, and S4 is annular. However, the shape of each support portion is not limited, for example, a plurality of projections arranged in a circumferential direction may be utilized as the support portion.

Further, the shock absorber D of the present embodiment includes a cylinder 1, a piston rod 3 inserted into the cylinder 1 so as to be movable in the axial direction, and the damping valve V. The damping valve V (valve) provides the resistance to the flow of liquid that occurs when the cylinder 1 and the piston rod 3 move relatively in the axial direction. Therefore, when the shock absorber D extends and contracts and then cylinder 1 and the piston rod 3 move relatively in the axial direction, the shock absorber D can generates the damping force caused by the resistance of the damping valve V.

Further, the damping valve V of the present embodiment includes the main valve case 4 in which the passages 4c and 4d are formed, and the main valve bodies 6 and 7 stacked on the main valve case 4 and open and close the passage 4c and 4d. The passages 4c and 4d of the main valve case 4 is connected in series with the gap P formed between the free end 8e of the valve body 8 and the facing surface 5e.

As described above, in a case where the damping valve V is configured to have the main valve bodies 6 and 7 and the valve body 8, since the range of the piston speed that deflects the valve body 8 and the range of the piston speed that opens the main valve bodies 6 and 7 can be set respectively, the damping force characteristics of the shock absorber D can be finely set.

Furthermore, in the present embodiment, when the piston speed (the speed of the piston rod 3 moving relative to the cylinder 1) is in a speed range lower than a predetermined speed, such as the extremely low-speed range, the main valve bodies 6 and 7 close and the free end 8e of the valve body 8 faces the facing surface 5e. Therefore, in the speed range where the piston speed is lower than the predetermined speed, the liquid flows through the gap P formed between the free end 8e and the facing surface 5e opposing each other, the shock absorber D can generate the damping force caused by the resistance applied to the flow of the liquid.

On the other hand, when the piston speed is in a speed range higher than a predetermined speed, such as in the medium-high-speed, the main valve bodies 6 and 7 open and the outer peripheral portion of the valve body 8 (the end portion of the free end 8e side) deflects such that the free end 8e and the facing surface 5e do not face each other. As a result, the resistance applied to the flow of the liquid passing through the valve body 8 is reduced. Therefore, in the speed range where the piston speed is higher than the predetermined speed, the shock absorber D can generate the damping force caused by the resistance of the main valve bodies 6 and 7.

Figure 6:
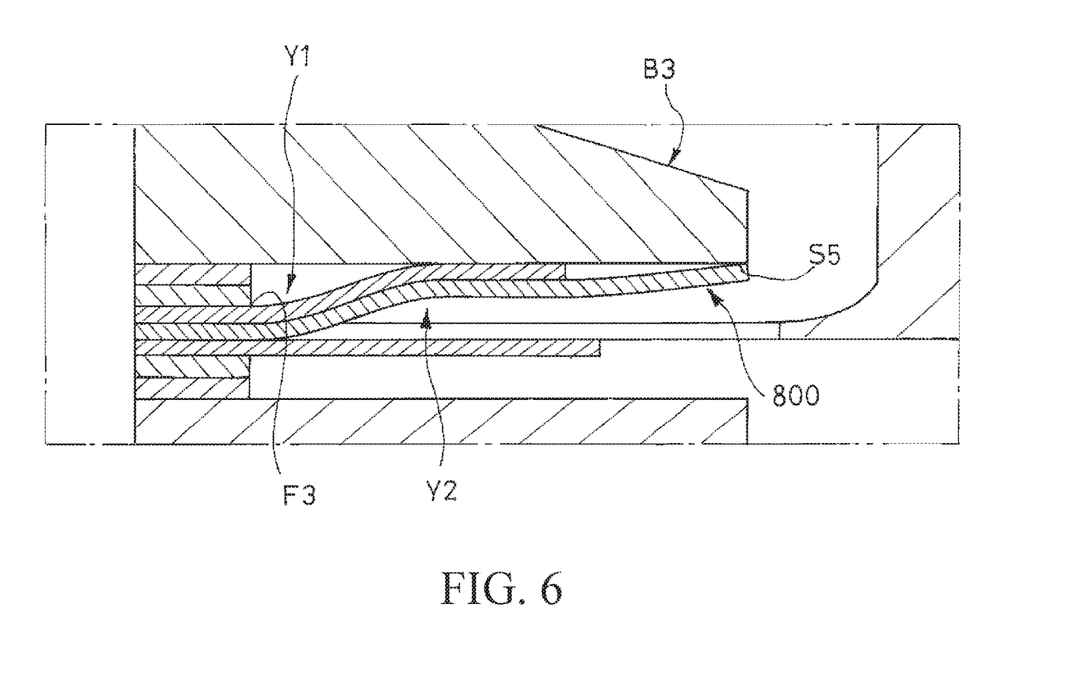
FIG. 6 is a partial enlarged view showing a state where an outer peripheral portion of a valve body of the conventional valve is deflected to an upper side in a drawing.

When the valve body 8 is utilized for the generation of the damping force in the speed range where the piston speed is lower than the predetermined speed, such as in the extremely low-speed range, since the valve body 8 having a low rigidity is generally utilized, the valve body 8 is easily deflected as shown in FIG. 6. Therefore, when using the valve body 8 to generate the damping force in the speed range lower than the predetermined speed, it is particularly effective to provide the plurality of the support portions, which can support different positions of the valve body 8 in the radial direction at different heights, to the valve stopper.

Further, the main valve case 4 of the embodiment has the main body portion 4a in which the passages 4c and 4d are formed, and the cylindrical skirt portion 4b protruding from one end outer peripheral portion of the main body portion 4a. Furthermore, the valve case 5 has the fitting portion 5a fitting to the inner periphery of the skirt portion 4b, and the cylindrical case portion 5b protruding from one end outer peripheral portion of the fitting portion 5a to the outside of the skirt portion 4b.

Then, the first valve stopper B1 is inserted into the case portion 5b, the valve body 8 and the second valve stopper B2 are disposed on an anti-fitting portion side of the first valve stopper B1. The communication passage 5c is formed in the fitting portion 5a to communicate the gap P formed between the free end 8e and the facing surface 5e with the passages 4c and 4d of the main valve case 4.

Therefore, according to the above configuration, it is easy to connect the passages 4c, 4d and the gap P in series. It should be noted that the configurations of the main valve case 4 and the valve case 5 are not limited to the above, and can be appropriately changed. Furthermore, the valve body 8 does not necessarily have to be used in combination with the main valve bodies 6 and 7.

In the above description, the range of the piston speed is divided to the extremely low-speed range, the low-speed range, and medium-high-speed range. In the extremely low-speed range, valve body 8 is not deflected and the main valve bodies 6 and 7 are maintained in the closed state. In the low-speed range, the valve body 8 is deflected but the main valve bodies 6 and 7 are closed. In the medium-high-speed range, the valve body 8 is deflected and the main valve bodies 6 and 7 are opened. However, the range of the piston speed may be divided in any way, and a threshold of each range can also be arbitrarily set.

Further, in the present embodiment, the inner peripheral end of the valve body 8 is the fixed end 8*d*, the outer peripheral end is the free end 8*e*, and the facing portion 5*d* is located on the outer peripheral side of the valve body 8. Conversely, the inner peripheral end of the valve body may be a free end, the outer peripheral end may be a fixed end, and the facing portion may be located on the inner peripheral side of the valve body 8. In this case, the first and second valve stoppers B1 and B2 are respectively configured to have a plurality of annular members having different inner diameters.

Furthermore, in the present embodiment, the facing surface 5*e* is formed on the valve case 5 itself, the facing portion 5*d* including the facing surface 5*e* and the fitting portion 5*a* on which the valve body 8 is stacked are integrally formed. Therefore, since the number of parts of the damping valve V is small, it is possible to facilitate an assembly work. It should be noted that after forming the facing portion 5*d* including the facing surface 5*e* and the valve case including the fitting portion 5*a* individually, the facing portion 5*d* and the valve case may be integrated by assembling.

Further, the damping valve (valve) V according to the present embodiment is embodied in the piston portion mounted on the piston rod 3 of the shock absorber D. However, the rod that moves into and out from the cylinder may not necessarily be the piston rod to which the piston is attached, and the position where the damping valve V is provided is not limited to the piston portion. For example, as described above, in the case where the shock absorber includes the reservoir chamber and compensates for the volume of the piston rod moving into and out from the cylinder by the reservoir chamber, a damping valve V may be provided in the middle of a passage communicating the cylinder with the reservoir chamber.

These changes can be made regardless of the position, number, and shape of the support portions provided in the first and second valve stoppers B1 and B2, and a forming method of the first and second valve stoppers B1 and B2.

The configurations, operations, and effects of the embodiments of the present invention as described above will be collectively described below.

The valve (damping valve V) includes the valve case 5; the annular valve body 8, one of the inner peripheral end and the outer peripheral end of which is the free end 8*e* movable to both sides in the axial direction with respect to the valve case 5; the facing portion 5*d* provided in the valve case 5, the facing portion 5*d* including the annular facing surface 5*e* which is located on the inner peripheral side or the outer peripheral side of the valve body 8 and is configured to face the free end 8*e* with the gap P; and the first and second valve stoppers B1 and B2 which are located on both sides respectively in the axial direction of the valve body 8. The first and second valve stoppers, respectively, have a plurality of support portions (S1, S2 or S3, S4) that are configured to support different positions of the valve body 8 in the radial direction at different heights when the valve body 8 deflects.

According to this configuration, even if the height difference between the deflection fulcrums F1 and F2 of the valve body 8 and the support portions S1, S3 supporting the valve body 8 at the highest position is large, the positions, lower than the support positions S1, S3 and radially displaced from the support positions S1, S3, are supported by the other support portions S2, S4. Therefore, the stress generated when the valve body 8 deflects is reduced, and thereby, it is possible to improve the durability of the valve body 8.

In the valve (damping valve V), among the plurality of support portions (S1, S2, S3, S4), the support portion supporting the valve body 8 at the free end 8*e* side in the radial direction supports the valve body 8 at higher position. According to this configuration, the stress generated in the valve body 8 can be dispersed to reduce the maximum generated stress efficiently and reasonably, and thereby, it is possible to improve the durability of the valve body 8 with certainty.

In the valve (damping valve V), each of the first and second valve stoppers B1 and B2 is configured to have the plurality of annular members (stopper member 9, 90 or nut 30, stopper member 91) having different inner or outer diameters, each of the plurality of annular members is provided with the support portion (S1, S2, S3, or S4). According to this configuration, it is possible to easily adjust the position for supporting the valve body 8 using the support portions (S1, S2, S3, S4). Furthermore, since the first and second valve stoppers B1 and B2 can be configured by combining the highly versatile annular member, the first and second valve stoppers B1 and B2 can be inexpensive.

In the valve (damping valve V), the annular facing surface 5*e* capable of facing the free end 8*e* of the valve body 8 with the gap P is formed at the facing portion 5*d* provided in the valve case 5. The valve (damping valve V) includes the main valve case 4 in which the passages 4*c* and 4*d* in series with the gap P are formed, and the main valve bodies 6 and 7 stacked on the main valve case 4, the main valve bodies 6 and 7 being configured to open and close the passages 4*c* and 4*d*. According to this configuration, when the valve (damping valve V) is utilized in the shock absorber D, it is possible to finely set the characteristics of the damping force of the shock absorber D.

In the valve (damping valve V), the main valve case 4 has the main body portion 4*a* in which the passages 4*c* and 4*d* are formed, and the cylindrical skirt portion 4*b* protruding from one end outer peripheral portion of the main body portion 4*a*, the valve case 5 has the fitting portion 5*a* fitting to the inner periphery of the skirt portion 4*b*, and the cylindrical case portion 5*b* protruding from one end outer peripheral portion of the fitting portion 5*a* to the outside of the skirt portion 4*b*, the first valve stopper B1 is inserted into the case portion 5*b*, the valve body 8 and the second valve stopper B2 are disposed on the anti-fitting portion side of the first valve stopper B1, the communication passage 5*c* is formed in the fitting portion 5*a* to communicate the gap P formed between the free end 8*e* of the valve body 8 and the facing surface 5*e* with the passages 4*c* and 4*d*. According to this configuration, it is easy to connect the gap P and the passages 4*c* and 4*d* in series.

The shock absorber D includes the cylinder 1, the rod (piston rod 3) inserted into the cylinder 1 so as to be movable in the axial direction, and the valve (damping valve V). The valve (damping valve V) is configured to provide the resistance to the flow of liquid that occurs when the cylinder 1 and the rod (piston rod 3) move relatively in the axial direction, in the speed range where the speed (piston speed) of the rod (piston rod 3) moving relative to the cylinder 1 is lower than the predetermined speed, the main valve bodies 6 and 7 close and the free end 8*e* of the valve body 8 faces to the facing surface 5*e*, in the speed range where the speed (piston speed) of the rod (piston rod 3) moving relative to the cylinder 1 is higher than the predetermined speed, the main valve bodies 6 and 7 open and an end portion of the free end 8e side of the valve body 8 deflects such that the free end 8e and the facing surface 5e do not face each other.

According to this configuration, in the speed range where the speed (piston speed) of the rod (piston rod 3) is lower than the predetermined speed, the liquid flows through the gap P formed between the free end 8e and the facing surface 5e opposing each other, the shock absorber D can generate the damping force caused by the resistance applied to the flow of the liquid. On the other hand, in the speed range where the speed (piston speed) of the rod (piston rod 3) is higher than the predetermined speed, the shock absorber D can generate the damping force caused by the resistance of the main valve bodies 6 and 7.

Furthermore, when the valve body 8 is utilized for the generation of the damping force in the speed range where the speed (piston speed) of the rod (piston rod 3) is lower than the predetermined speed, since the valve body 8 having a low rigidity is generally utilized, the valve body 8 is easily deflected. Therefore, in the shock absorber D having the above configuration, it is particularly effective to provide the plurality of the support portions (S1, S2, S3, S4), which can support different positions of the valve body 8 in the radial direction at different heights, to the first and second valve stoppers B1 and B2.

Embodiments of this invention were described above, but the above embodiments are merely examples of applications of this invention, and the technical scope of this invention is not limited to the specific constitutions of the above embodiments.

This application claims priority based on Japanese Patent Application No. 2018-073596 filed with the Japan Patent Office on Apr. 6, 2018, the entire contents of which are incorporated into this specification.

The invention claimed is:

1. A valve comprising:
    a valve case;
    an annular valve body, an outer peripheral end of which is a free end movable to both of opposite sides in an axial direction with respect to the valve case;
    an annular facing portion provided in the valve case, the facing portion including an annular facing surface which is located at an outer peripheral side of the valve body and is configured to face the free end with a gap between them; and
    a valve stopper configured to limit an amount of a deflection of the valve body, wherein
    the valve stopper has a plurality of support portions that are configured to support the valve body from a same one of the opposite sides in the axial direction, at positions different from one another both in a radial direction and in the axial direction,
    the valve case has a cylindrical case portion, the facing portion protruding inward in the radial direction from an inner periphery of the case portion,
    a diameter of the free end of the valve body is larger than a diameter of an outer peripheral edge of the valve stopper, the outer peripheral edge being one of the plurality of support portions that is provided on an outermost peripheral side among the plurality of support portions, and
    the outer peripheral edge of the valve stopper abuts a vicinity of the free end of the valve body to support the valve body when the valve body deflects.

2. The valve according to claim 1, wherein
    the plurality of support portions include a first support portion and a second support portion,
    the first support portion supports the valve body at a first position that is closer to the free end of the valve body in a radial direction and farther from the annular valve body in the axial direction than is a second position at which the second support portion supports the annular valve body.

3. The valve according to claim 1, wherein
    the valve stopper is configured to have a plurality of annular members having different outer diameters, and each of the plurality of annular members has a respective one of the plurality of support portions.

4. The valve according to claim 1, wherein
    the valve body has:
        a first leaf valve; and
        a second leaf valve laminated on the first leaf valve, a diameter of an outer periphery of the second leaf valve being smaller than a diameter of an outer periphery of the first leaf valve,
    the diameter of the outer periphery of the valve stopper being larger than the diameter of the outer periphery of the second leaf valve.

5. A valve, comprising:
    a valve case;
    an annular valve body, an outer peripheral end of which is a free end movable to both of opposite sides in an axial direction with respect to the valve case;
    an annular facing portion provided in the valve case, the facing portion including an annular facing surface which is located at an outer peripheral side of the annular valve body and is configured to face the free end with a gap between them;
    a valve stopper configured to limit an amount of a deflection of the annular valve body;
    a main valve case in which a passage in series with the gap is formed; and
    a main valve body stacked on the main valve case, the main valve body being configured to open and close the passage, wherein
    the valve stopper has a plurality of support portions that are configured to support the annular valve body, at positions different from one another both in a radial direction and in the axial direction,
    the valve case has a cylindrical case portion, the facing portion protruding inward in the radial direction from an inner periphery of the case portion, and
    a diameter of the free end of the annular valve body is larger than a diameter of an outer peripheral edge of the valve stopper, the outer peripheral edge being one of the plurality of support portions that is provided at an outermost peripheral side among the plurality of support portions.

6. The valve according to claim 5, wherein
    the main valve case has a main body portion in which the passage is formed, and a cylindrical skirt portion protruding from one end outer peripheral portion of the main body portion,
    the valve case has a fitting portion fitting to an inner periphery of the skirt portion, and a cylindrical case portion protruding from one end outer peripheral portion of the fitting portion to the outside of the skirt portion, the valve stopper has first and second valve stoppers which are located on respective ones of the opposite sides in the axial direction of the annular valve body, the first valve stopper is inserted into the case portion, the annular valve body and the second valve stopper are disposed on an anti-fitting portion side of the first valve stopper, and a communication passage is formed in the fitting portion to communicate the gap with the passage.

7. The shock absorber comprising:

a cylinder;

a rod inserted into the cylinder so as to be movable in the axial direction, and the valve according to claim 5, wherein the valve is configured to provide a resistance to a flow of liquid that occurs when the cylinder and the rod move relatively in the axial direction, in a speed range where a speed of the rod moving relative to the cylinder is lower than a predetermined speed, the main valve body closes and the free end faces to the facing surface, and in a speed range where the speed of the rod moving relative to the cylinder is higher than the predetermined speed, the main valve body opens and the free end of the annular valve body deflects such that the free end and the facing surface do not face each other.

8. The valve according to claim 5, wherein the plurality of support portions support the annular valve body from the same one of the opposite sides in the axial direction.

9. A valve comprising:

a valve case;

an annular valve body, one of an inner peripheral end and an outer peripheral end of which is a free end movable to both of opposite sides in an axial direction with respect to the valve case;

an annular facing portion provided in the valve case, the facing portion including an annular facing surface which is located on an inner peripheral side or an outer peripheral side of the valve body and is configured to face the free end with a gap between them; and a valve stopper configured to limit an amount of a deflection of the valve body; and a spacer that is interposed between the annular valve body and the valve stopper, wherein the valve stopper has a plurality of support portions that are configured to support the valve body from a same one of the opposite sides in the axial direction, at positions different from one another both in a radial direction and in the axial direction, the valve stopper has at least two stopper members having different inner or outer diameters, and a plate thickness of one of the at least two stopper members abutting the spacer is larger than a plate thickness of the spacer.

10. The valve according to claim 9, wherein the at least two stopper members are disposed at the same one of the opposite sides of the valve body in the axial direction.

* * * * *